United States Patent [19]

Steinhilber

[11] Patent Number: 4,802,714
[45] Date of Patent: Feb. 7, 1989

[54] DESK WITH AN ADDITIONAL LECTERN

[76] Inventor: Helmut Steinhilber, Vorrutiweg 12, CH-6052 Hergiswil, Switzerland

[21] Appl. No.: 129,735

[22] Filed: Dec. 7, 1987

[30] Foreign Application Priority Data

Dec. 13, 1986 [DE] Fed. Rep. of Germany ....... 3642672
Aug. 29, 1987 [EP] European Pat. Off. ........ 87112619.9

[51] Int. Cl.⁴ ............................................. A47B 17/00
[52] U.S. Cl. .................................. 312/196; 312/140.4; 312/323; 312/325
[58] Field of Search ...................... 312/194, 140.4, 323, 312/320, 231, 230, 233, 196, 325, 205; 108/93; 248/447, 460; 211/1.3

[56] References Cited

U.S. PATENT DOCUMENTS

| 1,819,821 | 8/1931 | Kullberg | 108/93 |
| 2,542,502 | 2/1951 | Fuller | 312/323 |
| 2,676,081 | 4/1954 | Smith | 312/140.4 |
| 2,795,473 | 6/1957 | Smith | 312/323 X |
| 2,823,973 | 2/1956 | De Vere Carver et al. | 312/323 |
| 3,049,390 | 8/1962 | Wolfe | 108/93 X |
| 4,335,659 | 6/1982 | Azzato et al. | 248/447 X |

FOREIGN PATENT DOCUMENTS

| 49504 | 2/1889 | Fed. Rep. of Germany . |
| 59420 | 4/1891 | Fed. Rep. of Germany . |
| 66157 | 11/1891 | Fed. Rep. of Germany . |
| 218058 | 9/1908 | Fed. Rep. of Germany . |
| 1953194 | 9/1971 | Fed. Rep. of Germany . |
| 7510211 | 8/1975 | Fed. Rep. of Germany . |
| 7640777 | 4/1978 | Fed. Rep. of Germany . |
| 998339 | 7/1965 | United Kingdom . |

Primary Examiner—Joseph Falk
Attorney, Agent, or Firm—Mason, Fenwick & Lawrence

[57] ABSTRACT

A desk having a lectern and apparatus for slidably guiding the lectern into a resting position under the top of the desk and for enabling the lectern to be pulled from the resting position into a working position in which the lectern projects over the desk top. The lectern is supported in the working position by at least one extension, at least one supporting arm, and apparatus secured beneath the desk top for slidably receiving the extension.

30 Claims, 5 Drawing Sheets

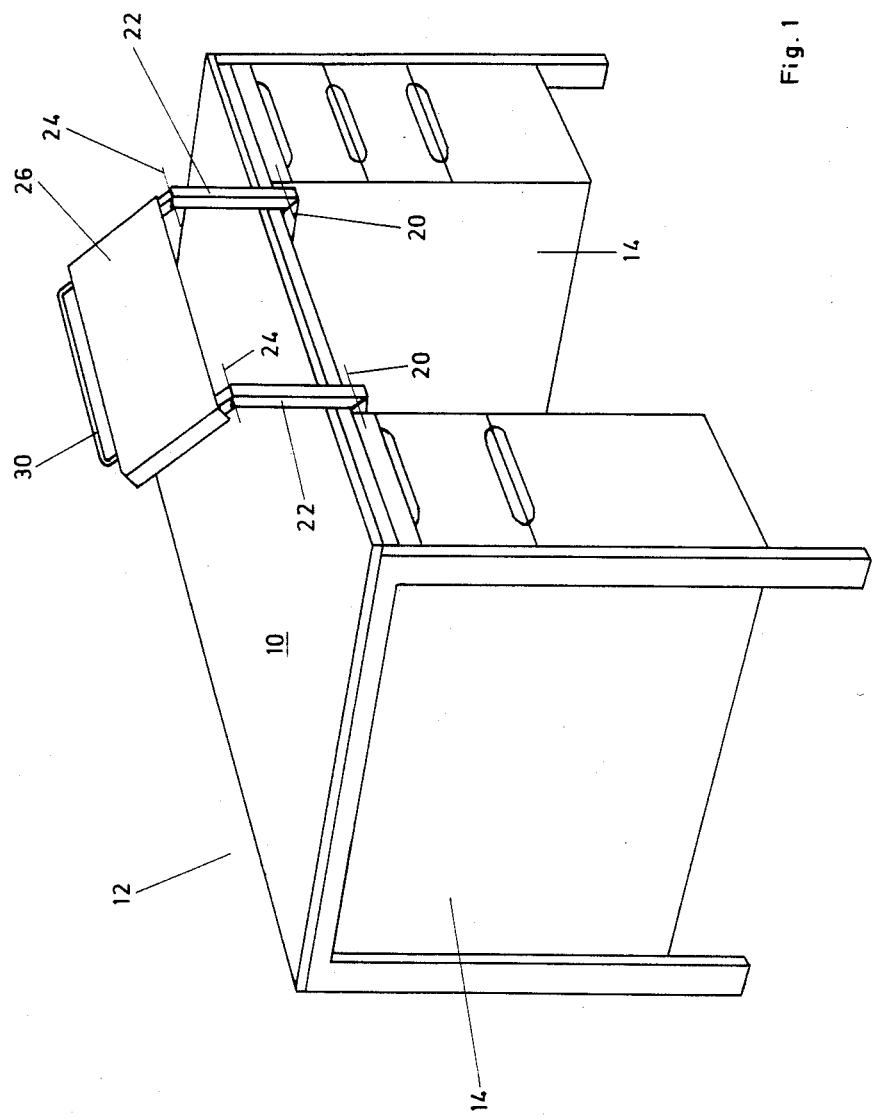

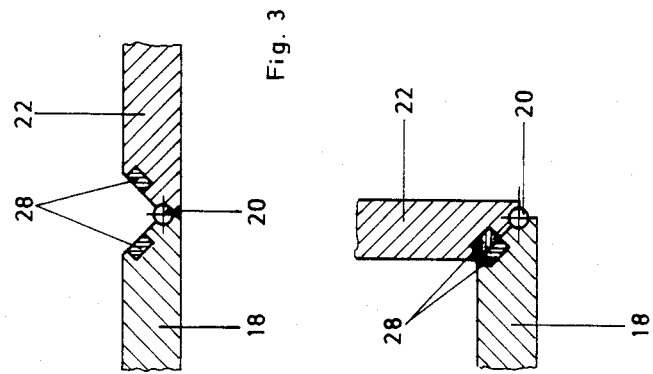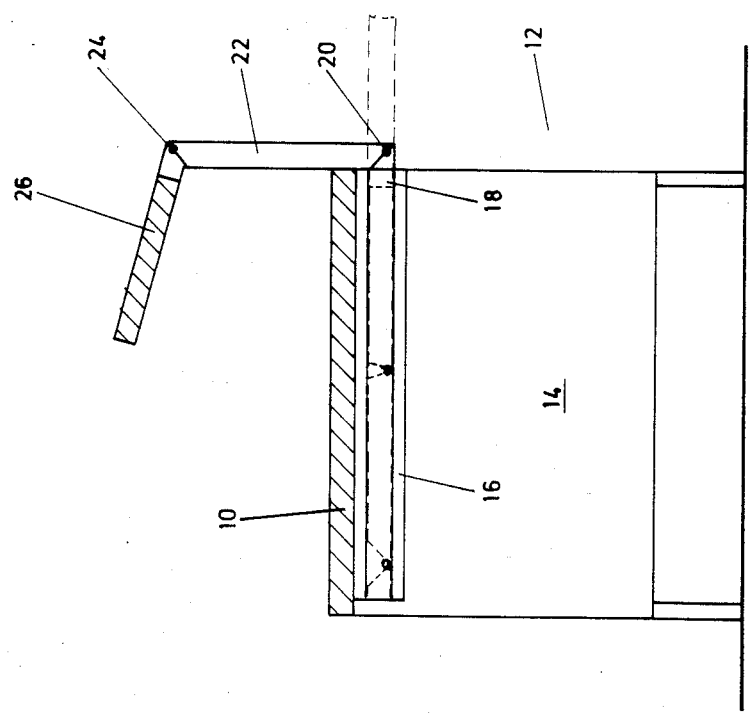

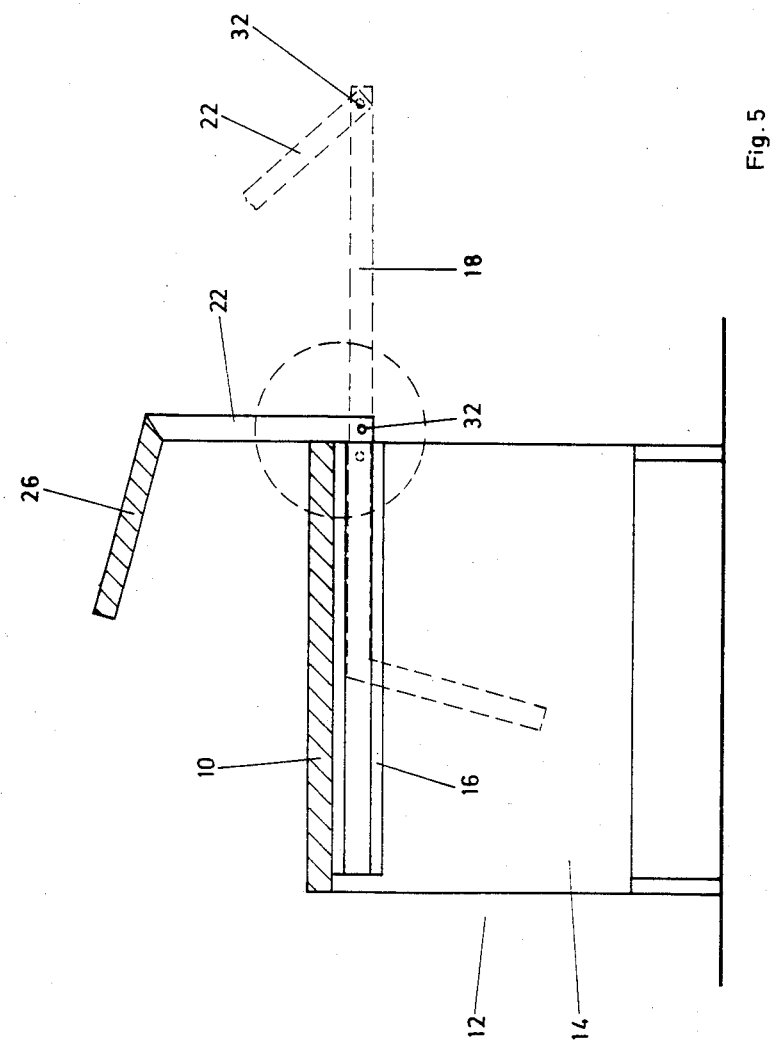

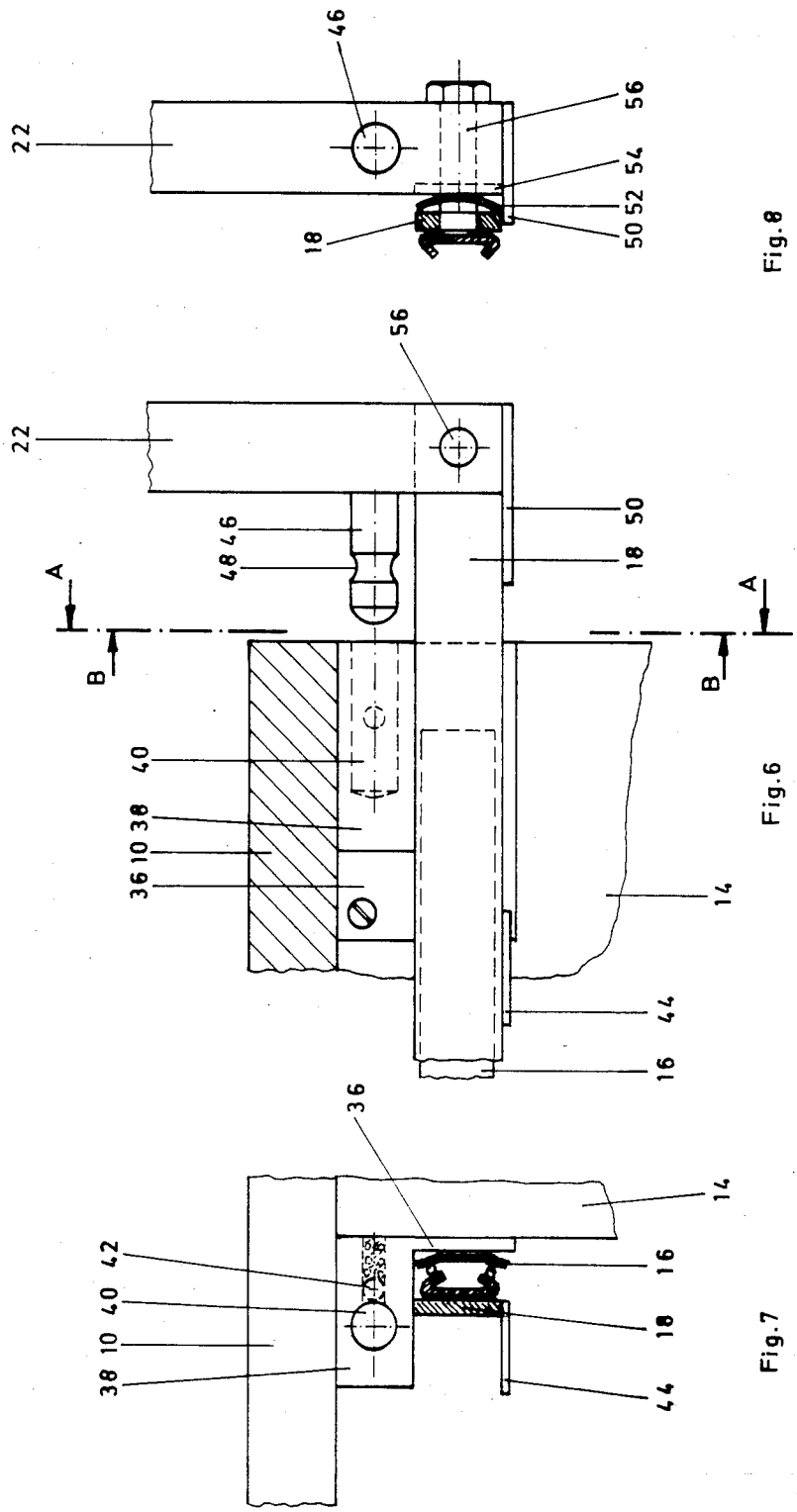

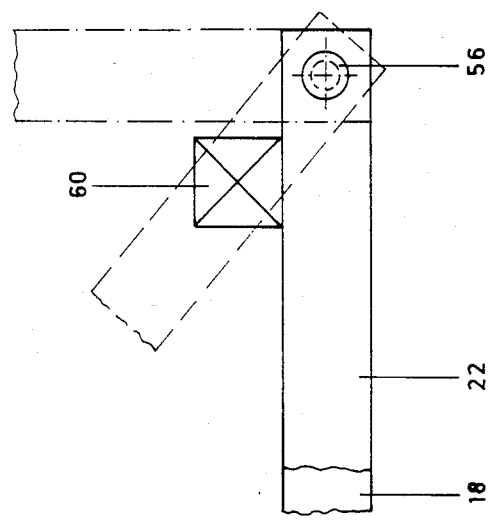
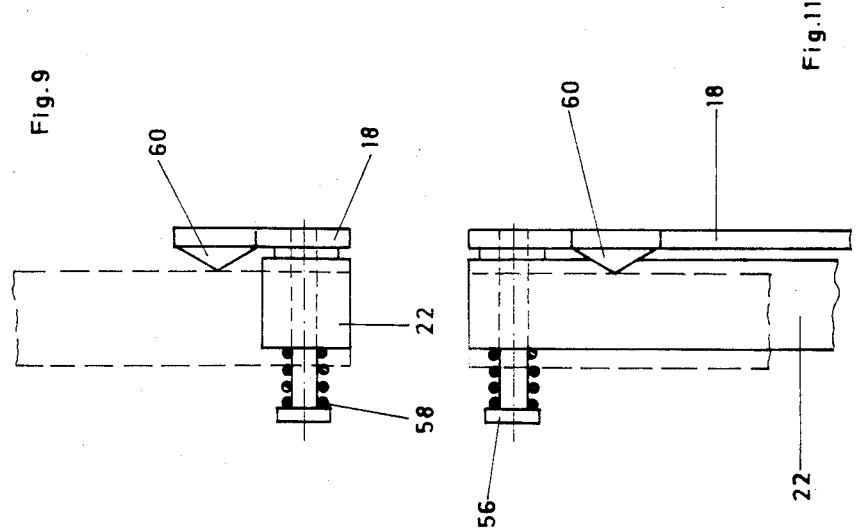

DESK WITH AN ADDITIONAL LECTERN

The invention relates to a desk with an additional lectern.

Persons usually work sitting at desks. However, many persons find prolonged seated activity unpleasant or irritating. Working standing at a lectern is therefore welcome as a change and a temporary interruption of seated activity at the desk. A lectern stood next to the desk for this purpose is disturbing because of the space it takes up and frequently also because of its appearance.

In order to avoid the need for additional space, it is known, for example from German Pat. No. 49 504, and German Pat. No. 59 420, to design a portion of the desktop to be height-adjustable, so that this part can be raised and used as a lectern. To be used as a lectern, this portion of the desktop must be cleared and is not available as a storage area while the lectern is in use. Conversion to a lectern is therefore time-consuming and inconvenient, and discourages frequent changes between seated and standing activitiy.

It is also known from German Pat. No. 66 157 and German utility model 75 10 211, to provide an additional lectern in the top of a desk which is slid or swung in its resting position into this top and is moved out of the top into a working position when it is desired to work standing at the lectern. In this known solution, the entire surface of the desk is unaffected by the additional lectern, so that while the individual is standing and working at the lectern, documents can remain lying on the top of the desk. This known solution, however, assumes a desktop which is not found on modern desks, which generally stand freely in the room.

German utility model 76 40 777 teaches a desk in which an additional lectern is disposed in a resting position beneath the desktop and forms the bottom of a drawer therein. The lectern can be pulled out under the desktop, guided by lateral grooves, and swung upward into a working position. In this working position, the lectern projects diagonally upward freely above the top of the desk, held in its working position by guide pins engaging the grooves. The edge of the additional lectern facing the user coincides in the working position with the edge of the desktop facing the user. The additional lectern can therefore also be used only as a working surface when seated. The additional lectern is not suitable for use when standing.

British Pat. No. 998 339 teaches a desk equipped with a drawing board which is slid beneath the desktop in the resting position. To bring the drawing board into its working position, a frame supporting the drawing board is pulled out, guided beneath the desktop, the drawing board is swung upward and supported by struts. To be able to support the drawing board in the working position, the top of the desk must be partially folded away. The desktop is therefore not available when the drawing board is in use. The edge of the drawing board facing the user is at the level of the desktop when in the working position, so that it cannot be used as a lectern when standing.

The goal of the invention is to design a desk of the species recited hereinabove such that the additional lectern is suitable for use in its working position when standing.

This goal is achieved in a desk of the species recited hereinabove.

Advantageous embodiments of the invention are listed in the subclaims.

In the desk according to the invention, the additional lectern, together with its supporting arms, is completely beneath the desktop in the resting position so that it is invisible and occupies no space. The lectern can be brought into the working position by hand in simple fashion. The lectern, together with its supporting arms, is pulled out from under the desktop; the arms are then pivoted upward and locked. The lectern, in the working position, is at the height which is suitable for use as a lectern when standing, and is kept stable by the locked arms. Since the lectern is supported only by the vertical arms and has no other support, it projects freely above the desktop. The working surface of the desk need therefore not be cleared in order to use the lectern. All required documents and equipment can remain on the desktop. Combined with its ease of use, this provides a rapid and convenient change between working in the seated and standing positions.

The design of the additional lectern is simple, so that the lectern does not make the desk significantly more expensive. The lectern is also especially suited for retrofitting existing desks. It is merely necessary to mount the telescoping tracks under the desktop. These can be mounted on the underside of the desktop, on the sides on the pedestals of the desk, or on a frame which can additionally be mounted beneath the desktop.

In one preferred embodiment, the support arms are located laterally next to the extendable parts of the telescoping tracks in the resting position. The lectern is then located in the area of the desk away from the user and under the top. The lectern therefore does not limit the available height of the space provided for the user's legs when it is in the resting position.

Since in this embodiment the lectern is away from the area occupied by the user's legs when in the resting position, it can be arranged to point downward even when in the resting position. The lectern then performs the additional function of a modesty panel which shields the area occupied by the user's legs from the view of persons opposite. Since the lectern, when in the working position, has the slope relative to the support arms which makes it suitable for use as a lectern while standing, it can retain this slope relative to the arms when in the resting position as well. It is therefore not necessary to pivot the lectern against the supporting arms when the lectern is brought from the resting position into the working position or vice versa. Handling is additionally simplified as a result. If adjustability of the slope angle of the lectern in the working position is eliminated, in this design the lectern can even be rigidly connected to the supporting arms. This produces an especially economical and stable design.

In another embodiment, the supporting arms and extending parts are arranged next to one another when extended in the resting position. The lectern is then under the desktop on the side facing the user when in the resting position. The height of the space available for the user's legs under the desk is thereby reduced by the thickness of the lectern. When the lectern is to be used, it can be swung up in two successive steps into the working position after being extracted. After being extracted for a distance that corresponds to the depth of the lectern, the latter can be swung up against the supporting arms in order to assume the inclination relative to the arms provided for the working position. Then the arms are pulled out further until their pivot point is pulled out beyond the edge of the table so that the arms can be swung into their vertical position. Then the arms are locked in position. This two-stage swinging motion means that only a small amount of clearance is required to pull out the lectern. This is advantageous when space is limited.

The invention will now be described in greater detail with reference to the embodiments shown in the drawing.

FIG. 1 is a perspective view of a desk provided according to the invention with a lectern.

FIG. 2 is a view of a desk in a first embodiment, sectioned through the central plane.

FIG. 3 is a hinge of this desk in the extended position.

FIG. 4 shows this hinge in the bent position.

FIG. 5 is a view of the desk in a second embodiment, sectioned through the central plane.

FIG. 6 is an enlarged view of the detail encircled in FIG. 5 of this desk.

FIG. 7 is a cutaway view along line A—A in FIG. 6.

FIG. 8 is a section along line B—B in FIG. 6.

FIG. 9 is a front view of the swivel joint of the desk in FIG. 5.

FIG. 10 is a side view of this swivel joint.

FIG. 11 is a top view of this swivel joint.

In the first embodiment shown in FIGS. 1-4, telescoping tracks 16 are fastened beneath top 10 of a desk 12 against pedestals 14 on either side of the space for the user's legs. Telescoping tracks 16 extend for nearly the entire depth of desktop 10 and specifically are guided nearly to the edge of top 10 facing the user. A supporting arm 22 is articulated by means of a hinge 20 to each end of extension 18 of each of telescoping tracks 16 on the side facing the user. The two supporting arms 22 have at their other, free ends a lectern 26 articulated by hinges 24 to support arms 22. As shown in FIGS. 2 and 3, hinges 20 and the bevel of extension parts 18 and support arms 22 are so designed that arms 22 are pivotable between one position, which is flush with extensions 18, and another position in which they are perpendicular to extensions 18 and project upward. In the vertically upward projecting position of arms 22, the latter are held by permanent magnets 28, fitted in the beveled surfaces of extensions 18 and arms 22.

Hinges 24 and the bevels of arms 22 and lectern 26 are so designed that lectern 26 is pivotable between a position in which it is flush with arms 22 and a position in which it is inclined at an angle of 60°, for example with respect to arms 22. This slope angle of lectern 26 with respect to arms 22 is selected so that lectern 26, in the raised working position, has a slope which is ergonomically optimal for the user. The slope angle can also be made adjustable in suitable fashion if desired.

The operation of the lectern is shown in FIG. 2. In the resting position indicated by the dashed lines, extensions 18, arms 22, and lectern 26 in the extended position are slid abutting one another under top 10 so that the entire lectern is invisible. In order to operate the lectern, the latter is pulled out horizontally, for example by means of a handle 30 mounted at its upper edge beneath desktop 10, as indicated by the dashed lines. As soon as lectern 26 with hinge 24 is pulled out from beneath desktop 10, lectern 26 can be swiveled upward. Then arms 22 are pulled out horizontally once again until hinges 20 are in front of desktop 10. Then arms 22 are swiveled vertically upward and held in this position by permanent magnets 28. Then extensions 18 are slid in once again under top 10 until vertically standing arms 22 abut the edge of the desk. In this working position, the arms are locked firmly to the desk in suitable fashion so that the lectern is stable and can take stress. Since lectern 26 is additionally held by its own weight and, when the lectern is in use, by the working pressure, there is no need for additional locking of lectern 26 relative to arms 22. However, permanent magnets can also be provided here in the beveled surfaces to hold lectern 26. In order to return the lectern to the resting position under desktop 10 after use, after releasing the locks, arms 22 and lectern 26 are brought against the force of the magnets back into their position flush with extensions 18 and can be slid together with the latter back under desktop 10.

In a variation of this embodiment, lectern 26 is not mounted to support arms 22 by means of a hinge and bevel, but can be folded against arms 22 by means of a lockable swivel joint. In this design, lectern 26 is slid, lying parallel on the arms, into the resting position beneath desktop 10. This design has the advantage that lectern 26, folded onto arms 22, requires no additional space in the lengthwise direction of telescoping tracks 16. Extensions 18 can therefore have a greater length, which lends better stability to the telescopic guide. Locking the swivel joint of lectern 26 does require an additional motion when erecting the lectern, but also provides an additional simple possibility for varying the slope angle of lectern 26 in the working position.

In the embodiment shown in FIG. 5, extensions 18 guided in telescoping tracks 16 have essentially the same length as telescoping tracks 16. Supporting arms 22 are swivelably mounted by means of a joint 32 at the ends of extensions 18 facing the user. In the resting position, supporting arms 22 are swung into a horizontal position in which they are located directly next to extensions 18 and are slid together with the latter under desktop 10 as indicated by the dashed lines in FIGS. 5. Lectern 26 in this resting position is located in the area of the desk away from the user.

In the embodiment shown in FIG. 5 lectern 26 is rigidly connected to supporting arms 22 at a predetermined slope angle of, for example, approximately 60°. In the resting position, lectern 26 therefore projects diagonally downward from horizontally disposed arms 22 as indicated by the dashed lines. Lectern 26 in this fashion closes off the leg area from the front, forming a modesty panel for the user's legs.

In order to move the lectern from the resting position shown by the dashed lines in FIG. 5 into the working position, extensions 18 of telescoping tracks 16 with supporting arms 22 are initially pulled out horizontally beneath desktop 18 for their full length, so that arms 22 with lectern 26 can be swung upward in front of the edge of desk top 10 facing the user, as is also indicated by the dashed lines in Figure 5. As soon as arms 22 have assumed their vertical position, extensions 18 are slid again in telescoping tracks 16 beneath desktop 10 until arms 22 abut the edge of the desk, as shown by the solid lines in FIG. 5. In this position, arms 22 are preferably locked firmly to the desk so that the lectern is stable and can accept loads in its working position.

In order to return the lectern from the working position to the resting position, after loosening the locks, extensions 18 with vertically mounted arms 22 are pulled out again until arms 22 and lectern 26 can be swung down again into the horizontal position. The lectern is then slid under desktop 10.

The rigid connection between lectern 26 and arms 22 produces a stable and inexpensive design. The considerable length of extensions 18 further improves stability.

Instead of a rigid connection of lectern 26 and arms 22, the latter can also be connected together by a lockable swivel joint. By means of this swivel joint, the slope angle between lectern 26 and arms 22 can be adjusted as desired. If lectern 26 in the resting position is to be used as a modesty panel, lectern 26 can still have a fixed slope angle, even when the lectern is swung from the working position to the resting position and vice versa.

By connecting lectern 26 and arms 22 by a swivel joint, it is also possible to arrange lectern 26 in the resting position horizontally either in the extended position as an extension of arms 22 or folded onto or between the latter. In this case, in order to set up and fold down the lectern, the fastening of the swivel joint between lectern 26 and arms 22 must be released and locked again each time. In order for the user to optimally adjust the lectern for his or her height, the lectern is preferably height-adjustable. For this purpose the supporting arms can be made to adjust lengthwise telescopically.

FIGS. 6 to 8 show in detail the swivelable mounting of arms 22 on extension 18 of telescoping tracks 16 and the locking of arms 22 in the working position in an embodiment.

On the extendable free end of extension 18 guided in telescoping track 16, supporting arm 22 is swivelably mounted by means of a pin 56. A flap-shaped stop 50 is welded to the end of arm 22, said stop projecting laterally beyond the profile of arm 22 and abutting extension 18 from below when arm 22 assumes its vertical position. Stop 50 prevents arm 22 from tilting toward the user when swung up beyond the vertical position.

Telescoping track 16 is welded to a plate-shaped brace 36 which is fastened to desk 12 to mount telescoping track 16, and is screwed, for example, to pedestal 14. A block 38 is provided on brace 36 between telescoping track 16 and desktop 10, said block having a locking hole 40 which is open toward the edge of the desk and is parallel to telescoping track 16. A locking pin 46 is mounted on arm 22, said pin projecting vertically from arm 22 in such fashion that when arm 22 is vertical, the pin is aligned horizontally with locking hole 40. If extension 18 is slid under desktop 10 with the lectern erected, locking pin 46 enters locking hole 40 and is held in hole 40 by a spring-loaded locking ball 42 disposed in block 38, said ball snapping into a circumferential locking groove 48 on locking pin 46. In this manner, arm 22 is locked in the working position of the lectern. Since locking pin 46 fits with practically zero play in locking hole 40, the total tilting moment acting on arms 22 when the lectern is in use is received by locking pin 46 and brace 36 of desk 12 without any strain on the telescoping guide. The lectern is therefore extremely stable in its working position.

When arms 22 are swung down into the horizontal position in order to bring the lectern into the resting position, arms 22, by virtue of their own weight and the weight of lectern 26, can swing down very rapidly, posing a risk of injury to the user if he has his finger(s) between arms 22 and extension 18. In order to eliminate this risk of injury, a spring washer 52 is inserted on pin 56 between extension 18 and arm 22, said washer cooperating with a frictional coating 54 provided on arm 22. The pressure of spring washer 52 acting on the friction coating brakes the swiveling motion of arm 22. The pressure of spring washer 52 and hence the braking moment acting on arm 22 can be adjusted by means of pin 56, which engages extension 18 with a thread and abuts arm 22 with a knurled head as shown in FIG. 8.

In the horizontal position of arm 22 when swung down, the latter rests on a pad 44 projecting laterally from extension 18.

FIGS. 9–11 show another way of preventing the user from hurting himself is he gets his finger(s) between arm 22 and extension 18 when arms 22 are swung down. For this purpose, a cam 60 projecting into the swivel plane of arms 22 is provided on extensions 18. Cam 60 is in the angle range of the swinging movement of arm 22 between its horizontal and vertical positions. Arm 22 is displaceable away from extension 18 on pin 56 against the pressure of a compression spring 58 sliding on pin 56.

With arm 22 in the horizontal position, the latter abuts extension 18 under the pressure of compression spring 58 and does not contact cam 60. When arm 22 is swiveled upward, it moves away from cam 60, being pushed away from extension 18 against the pressure of spring 58, as indicated by the dashed lines in FIGS. 9–11. In the vertical position shown by the dot-dashed lines in FIG. 10, arm 22 is again outside the range of cam 60 and is held against extension 18 by compression spring 58. When arm 22 is swung down from the vertical working position to the horizontal resting position, arm 22 is pushed in similar fashion away from extension 18 by cam 60. Arm 22, because of cam 60, therefore always maintains a distance from extension 18 when swung down such that the user's fingers cannot be caught between arm 22 and extension 18 as the lectern is swung down. Cam 60 also allows arms 22 to be locked in the vertical working position.

In the embodiments shown, two arms 22 are always provided on which lectern 26 is mounted. In order to provide a more attractive appearance for the lectern, it is also possible to connect two arms 22 guided in telescoping tracks 16 by a cross tie, with the lectern being supported by a single additional support arm, mounted centrally on this cross tie.

In another modification, a cross tie is provided mounted with its two ends directly pivotably in the ends of extension 18 of telescoping tracks 16 facing the user. The arms or preferably only a single arm are/is mounted on this cross tie and project(s) from the latter perpendicularly to that they/it are/is swiveled as the cross tie rotates from its horizontal resting position to the vertical working position. Locking in the vertical working position is accomplished in the manner shown in FIGS. 6 to 8, in which a locking pin is provided at at least one lateral end of the cross tie. Since the cross tie is mounted perpendicularly in extensions 18, in this embodiment no shearing effect between extensions 18 and arms 22 is possible, so that there is no risk of injury.

I claim:
1. A desk
   a lectern and,
   means for slidably guiding said lectern into a resting position under the top of said desk, and for enabling said lectern to be pulled from said resting position into a working position in which said lectern projects over said desktop, comprising:
   (a) at least one extension;
   (b) means secured to said desk beneath said desktop for slidably receiving said extension;
   (c) at least one supporting arm;

(d) means for pivotally connecting said supporting arms to said extension; and (e) means for pivotally connecting said lectern to said supporting arm;

(f) said first mentioned means and said lectern being free of means for supporting said lectern by engaging said desktop; whereby said lectern is supported in said working position by said supporting arm, said extension and said receiving means.

2. A desk of claim 1, wherein said receiving means comprises tracks mounted beneath said desktop perpendicular to the edge of said desk facing the user, and in an approximately parallel plane to said desktop.

3. A desk according to claim 1, and further including means for supporting said support arm in an approximately vertical position relative to the plane of the desktop of said desk when said lectern is in said working position.

4. A desk of claim 1, and further including means for supporting said lectern in said resting position at a slope that is the same as the slope of said lectern relative to said supporting arm when in said working position.

5. A desk of claim 1, further including means for supporting said lectern, said support arm and said extension in a common plane parallel to said desktop in said resting position.

6. A desk of claim 1, further including means for supporting said lectern in a parallel plane to said support arm when said lectern is in said resting position under a desktop of said desk.

7. A desk according to claim 1, further including means for supporting said lectern at a slope relative to said supporting arm when said lectern is in said working position, and means for adjusting said slope.

8. A desk according to claim 7 wherein said means for supporting comprises means for supporting said lectern at a slope of approximately 60 degrees to the horizontal.

9. A desk according to claim 1, further including means for locking said support arm in said working position.

10. A desk according to claim 1, further including means for supporting said support arm substantially perpendicular to said extension when said lectern is in said working position.

11. A desk according to claim 10 wherein said last mentioned means includes a bevelled edge of said support arm and a corresponding bevelled edge of said extension.

12. A desk according to claim 11, and further including magnetic means on said bevelled edges of said support arm and said extension for releasably holding said bevelled edges together, and for releasably holding said support arm in a substantially perpendicular position relative to said extension.

13. A desk according to claim 1, including hinge means for connecting said lectern to said support arm, and bevel means for positioning said lectern.

14. A desk according to claim 1, including lockable swivel means for connecting said lectern to said support arm.

15. A desk according to claim 1 further including means comprising a pin for swivelably connecting said supporting arm to said extension.

16. A desk according to claim 1 further including stop means mounted on said supporting arm for preventing said arm from tilting toward the user of said lectern in said working position.

17. A desk according to claim 16 wherein said stop means comprises a flap-shaped stop extending laterally beyond said supporting arm and abutting said extension when said supporting arm is in said working position.

18. A desk according to claim 1, and further including locking means for locking said arm in the working position.

19. A desk according to claim 18, wherein said locking means comprising a locking hole parallel to said receiving means, and a locking pin on said supporting arm for entering said hole when said supporting arm is in said working position.

20. A desk according to claim 19 further including means for locking said locking pin into said locking hole comprising a locking groove on said locking pin and a locking ball engageable in said locking groove.

21. A desk according to claim 1 further including at least one cross tie pivotally mounted to said extension and means for pivotally linking said extension to said support arm mounted to said cross tie.

22. A desk according to claim 1 further including means for braking said support arm when said lectern is moved from said working position to said resting position by said pivotal connecting means.

23. A desk according to claim 21 wherein said means for braking includes a spring washer and a pin mounted between said extension and said supporting arm, said spring washer being on said pin, and frictional coating on said supporting arm in juxtaposition with said spring washer for braking the pivotal motion of said support arm when pressed by said spring washer.

24. A desk according to claim 23 further including means for adjusting the pressure of said spring washer on said frictional coating.

25. A desk according to claim 24 wherein said means for adjusting comprises a pin having a thread and a knurled head, said thread engaging said extension, and said knurled head abutting said supporting arm.

26. A desk according to claim 22 wherein said means for braking comprises cam means on said extension for pushing said supporting arm away from said extension when said lectern is moved from said working position to said resting position, and further including a spring and a pin mounted between said extension and said supporting arm, said spring being slidably mounted on said pin to push said support arm away from said extension.

27. A desk according to claim 1 further including a pad projecting laterally from said extension for supporting said support arm when in said resting position.

28. A desk according to claim 1 wherein said support arm has length, and further including means for adjusting the length of said support arm.

29. A desk,
a lectern and,
means for slidably guiding said lectern into a resting position under the top of said desk, and for enabling said lectern to be pulled from said resting position into a working position in which said lectern projects over said desktop, consisting of:
(a) track means for slidably receiving an extension;
(b) extension means slideable in said track means for movement therealong;
(c) support arm means for supporting said lectern;
(d) means for pivotally connecting said support arm means to said extension means; and
(e) means for pivotally connecting said lectern to said support arm means.

30. A desk comprising:
(a) at least one track secured to the underside of the top of said desk;
(b) at least one extension slideable in said track;
(c) at least one support arm;
(d) means for pivotally connecting said support arm to said extension;
(e) a lectern;
(f) means for pivotally connecting said lectern to said support arm;
(g) means for supporting said lectern over the top of said desk when said supporting arm extends upwardly from said extension;
(h) said supporting means and said lectern being free of means for supporting said lectern by engaging said desktop.

* * * * *